US011513210B2

(12) United States Patent
Chun et al.

(10) Patent No.: US 11,513,210 B2
(45) Date of Patent: Nov. 29, 2022

(54) SENSOR CLUSTER DEVICE AND VEHICLE INCLUDING THE SAME

(71) Applicant: HYUNDAI MOBIS CO., LTD., Seoul (KR)

(72) Inventors: Jun Su Chun, Yongin-si (KR); Hee Chang Roh, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 489 days.

(21) Appl. No.: 16/726,905

(22) Filed: Dec. 25, 2019

(65) Prior Publication Data
US 2021/0124038 A1 Apr. 29, 2021

(30) Foreign Application Priority Data
Oct. 25, 2019 (KR) .................. 10-2019-0134010

(51) Int. Cl.
*G01S 13/86* (2006.01)
*G01S 17/86* (2020.01)
*G01D 11/24* (2006.01)
*G01S 17/87* (2020.01)
*F28F 3/02* (2006.01)

(52) U.S. Cl.
CPC .............. *G01S 13/865* (2013.01); *F28F 3/02* (2013.01); *G01D 11/245* (2013.01); *G01S 13/867* (2013.01); *G01S 17/86* (2020.01); *G01S 17/87* (2013.01)

(58) Field of Classification Search
CPC ....... G01S 13/865; G01S 17/86; G01S 13/867
See application file for complete search history.

(56) References Cited

U.S. PATENT DOCUMENTS

| | | | |
|---|---|---|---|
| 6,501,652 B2 * | 12/2002 | Katsui ................... | H01L 23/467 257/E23.099 |
| 2002/0121358 A1 * | 9/2002 | Lee ...................... | H01L 23/4093 165/185 |
| 2006/0061970 A1 * | 3/2006 | Lee ........................ | H01L 23/467 361/709 |
| 2010/0245179 A1 * | 9/2010 | Puzella .............. | H05K 7/20154 343/702 |
| 2016/0349042 A1 * | 12/2016 | Hsin ...................... | G01B 11/25 |
| 2019/0079532 A1 * | 3/2019 | Crawley ................. | G01S 17/36 |

FOREIGN PATENT DOCUMENTS

| KR | 10-2018-0084463 | | 7/2018 | |
|---|---|---|---|---|
| WO | WO-2019021693 A1 * | | 1/2019 | ............... B60Q 1/08 |

* cited by examiner

*Primary Examiner* — Timothy A Brainard
*Assistant Examiner* — Helena H Seraydaryan
(74) *Attorney, Agent, or Firm* — H.C. Park & Associates, PLC

(57) ABSTRACT

A sensor cluster device including a radar sensor configured to receive electromagnetic waves reflected from an object so as to acquire information on the object, a lidar sensor configured to receive laser beams reflected from the object so as to acquire information on the object, a camera sensor configured to acquire information from an image in which surroundings of the object are captured, an infrared sensor that detects heat radiated from peripheral objects in the surroundings of the object to observe the object and the peripheral objects, a body member having a front surface on which the radar sensor, the lidar sensor, the camera sensor, and the infrared sensor are installed, and a heat dissipation member configured to discharge heat, which is transferred to the body member, to the outside.

15 Claims, 13 Drawing Sheets

SENSOR CLUSTER DEVICE AND VEHICLE INCLUDING THE SAME

CROSS-REFERENCE TO RELATED APPLICATION

This application claims priority from and the benefit of Korean Patent Application No. 10-2019-0134010, filed on Oct. 25, 2019, which is hereby incorporated by reference for all purposes as if fully set forth herein.

BACKGROUND

Field

Exemplary embodiments relate to a sensor cluster device and a vehicle including the same, and particularly, to a sensor cluster device having improved heat dissipation performance and a vehicle including the same.

Discussion of the Background

Generally, an autonomous driving system uses GPS position information and signals acquired from various sensors on the basis of road map information to automatically control driving of a vehicle from a start point to an end point on a road or to assist a driver in driving the vehicle, thereby enabling safe driving.

In particular, the autonomous driving system requires assistance of a graphic processing device and a sensor capable of recognizing peripheral objects, so as to recognize, in real time, driving environments of the vehicle that moves at a high speed and determine the recognized driving environments.

Here, the sensor may measure a distance between objects and detect a risk, thereby providing assistance in viewing all areas without a blind spot.

However, since sensors in accordance with the related art are dispersed over a vehicle, there has been a difficulty in installing the sensors. Accordingly, it has been difficult to acquire accurate information due to a heavy load of collecting the information or performing an arithmetic operation. In particular, since the sensors are dispersed over the vehicle, there has been a difficulty in effectively dissipating heat.

The above information disclosed in this Background section is only for enhancement of understanding of the background of the invention and, therefore, it may contain information that does not constitute prior art.

SUMMARY

Exemplary embodiments of the present invention provide a sensor cluster device, in which sensors including a radar, a lidar, a camera, and an infrared camera are mounted on a single device, so as to be able to enhance efficiency of installation, facilitate collection of information to improve efficiency of an arithmetic operation, and particularly, effectively dissipate heat of the sensors, and a vehicle including the sensor cluster device.

Additional features of the invention will be set forth in the description which follows, and in part will be apparent from the description, or may be learned by practice of the invention.

An exemplary embodiment of the present invention provides a sensor cluster device including: a radar sensor configured to emit electromagnetic waves onto an object and receive the electromagnetic waves reflected from the object so as to acquire information on the object; a lidar sensor configured to emit laser beams onto the object and receive the laser beams reflected from the object so as to acquire information on the object; a camera sensor configured to capture an image of surroundings of the object and acquire information from the captured image; an infrared sensor configured to detect heat radiated from peripheral objects in the surroundings of the object to observe the object and the peripheral objects; a body member having a front surface on which the radar sensor, the lidar sensor, the camera sensor, and the infrared sensor are installed; and a heat dissipation member configured to discharge heat, which is transferred from the radar sensor, the lidar sensor, the camera sensor, and the infrared sensor to the body member, to the outside.

The heat dissipation member may include a heat dissipation part provided on a rear surface of the body member and a heat dissipation fan coupled to the heat dissipation part.

The heat dissipation part may include a main heat dissipation fin provided on a central portion of the rear surface of the body member and a plurality of auxiliary heat dissipation fins provided on an edge of the rear surface of the body member.

The main heat dissipation fin and the auxiliary heat dissipation fins may be integrated with each other on the rear surface of the body member.

The main heat dissipation fin may include a body having a horizontal plate shape and blades extending diagonally from both sides of the body, and the heat dissipation fan may be coupled over the body and the blades so as to blow air into a space between the body and the blades.

A speed of the heat dissipation fan may be adjusted through weather measured by the camera sensor and a temperature measured by the infrared sensor.

The body member may be made of a heat dissipation material.

The sensor cluster device may include a partition wall member configured to isolate the radar sensor, the lidar sensor, the camera sensor, and the infrared sensor, which are provided on the body member, from each other.

The partition wall member may include a single horizontal partition wall configured to isolate the radar sensor and the lidar sensor from the camera sensor and the infrared radar.

Two upper vertical partition walls may be provided over the single horizontal partition wall, the camera sensor may be positioned between the two upper vertical partition walls, and the infrared sensor may be positioned on each of two areas outside the two upper vertical partition walls.

Two lower vertical partition walls may be provided below the single horizontal partition wall, the radar sensor may be positioned between the two lower vertical partition walls, and the lidar sensor may be positioned on each of two areas outside the two lower vertical partition walls.

The horizontal partition wall, the upper vertical partition walls, and the lower vertical partition walls may be integrated with each other on the body member and made of a heat dissipation material.

The sensor cluster device may further include a cover member that accommodates the body member on which the radar sensor, the lidar sensor, the camera sensor, and the infrared sensor are installed, wherein the cover member may include: a case in which an accommodation space with one surface opened is provided to accommodate the body member on which the radar sensor, the lidar sensor, the camera sensor, and the infrared sensor are installed; and a cover which is coupled to the opening of the case.

A plurality of punched holes may be defined in a surface of the case that corresponds to the heat dissipation fan.

Another exemplary embodiment of the present invention provides a vehicle including: the sensor cluster device; and a vehicle body on which the at least one sensor cluster device is installed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
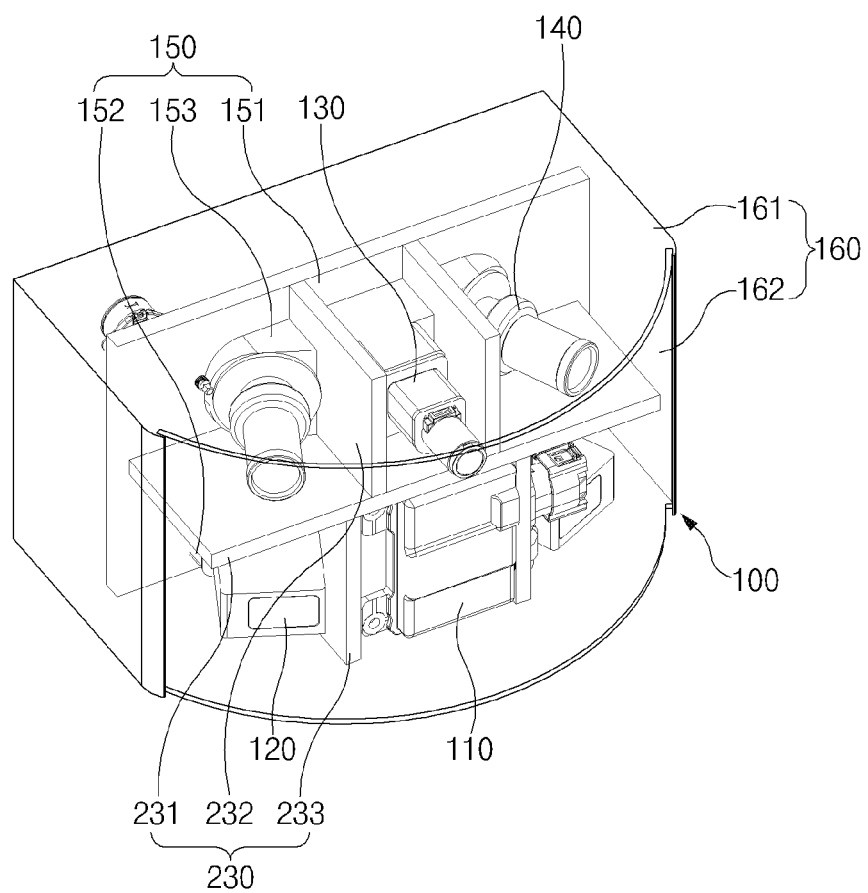
FIG. 1 is a front perspective view illustrating a sensor cluster device in accordance with a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

A sensor cluster device 100 in accordance with a first exemplary embodiment of the present invention is to observe driving environments of a subject (for example, a vehicle) moving at a high speed, and includes a radar sensor 110, a lidar sensor 120, a camera sensor 130, and an infrared sensor 140, and a body member 150, as illustrated in FIGS. 1 to 11.

That is, in the sensor cluster device 100 in accordance with the first exemplary embodiment of the present invention, the radar sensor 110, the lidar sensor 120, the camera sensor 130, and the infrared sensor 140 may be mounted on a single body member 150 to enhance efficiency of installation, remove a blind spot that is not observed, and particularly, improve accuracy of the observation.

The radar sensor 110 emits electromagnetic waves onto an object and receives the electromagnetic waves reflected from the object so as to acquire information on the object. That is, the radar sensor 110 captures the reflected waves, which are generated when radio waves collide with a target, so as to find existence of the target. For example, there may be an RF signal for the radar sensor 110, and a frequency modulated continuous wave (FMCW) method, a pulse method, or the like may be used as a modulation method for transmitting the RF signal. The FMCW method among the above-described methods is useful to detect a target that is positioned within a short distance, and has excellent reception performance because it is sufficient to merely detect frequencies even when reception sensitivity is weakened with the distance.

The radar sensor 120 emits laser beams onto an object and receives the laser beams reflected from the object so as to acquire information on the object. That is, the lidar sensor 120 is used as a range measurement sensor when an unmanned vehicle is driven autonomously. For example, while the vehicle moves, the lidar sensor 120 scans, in real time, information on obstacle surfaces and surrounding topography related to a distance range of interest.

The camera sensor 130 captures an image of surroundings of an object and acquires information from the captured image. That is, the camera sensor 130 detects visible light (wavelength: about 380 nm to about 780 nm).

The infrared sensor 140 detects heat radiated from peripheral objects in the surroundings of an object to observe the object and the peripheral objects. That is, the infrared sensor 140 uses infrared light to detect heat (wavelength: about 780 nm to about 1,400 nm) radiated from the object.

The body member 150 is a member on which the radar sensor, the lidar sensor, the camera sensor, and the infrared sensor are installed. The body member 150 includes a body block 151, a lower block 152 which is provided on a lower portion of one surface of the body block 151 and in which the radar sensor 110 and the lidar sensor 120 are installed, and an upper block 153 which is provided on an upper portion of the one surface of the body block 151 and in which the camera sensor 130 and the infrared sensor 140 are installed.

Here, in the body member 150, the camera sensor 130, and the infrared sensor 140, which require wide viewing angles, are disposed at the upper portion of the body block 151. The radar sensor 110 and the lidar sensor 120, which require narrower viewing angles than the camera sensor 130 and the infrared sensor 140, are disposed at the lower portion of the body block 151.

Also, the lower block 152 includes a lower central part 152*a* on which the radar sensor 110 is installed and two lower lateral parts 152*b* which are respectively provided on both sides of the lower central part 152*a*. The lidar sensor 120 is installed on each of the two lower lateral parts 152*b*. That is, since the radar sensor 110 has an azimuth angle greater than that of the lidar sensor 120 in the lower block 152, the radar sensor 110 is disposed on a central area, and the lidar sensors 120 are disposed on both sides of the radar sensor 110. For example, one radar sensor is installed on the lower central part 152*a* of the lower block 152 because the radar sensor 110 is capable of covering an angle range of about 110° or more when mounted on a vehicle, and two lidar sensors 120 are installed on the lower lateral parts 152*b* of the lower block 152 to cover an angle range of about 110° or more because the lidar sensor 120 is capable of covering an angle range of about 90° when mounted on a vehicle.

Here, the two lidar sensors 120 are installed on the two lower lateral parts 152*b* so that the azimuth angles of the lidar sensors overlap each other by a first azimuth angle α°. That is, the two lidar sensors 120 have azimuth angles for observing the object, and the azimuth angles are allowed to partially overlap each other. More specifically, when the two lidar sensors 120 are mounted on the vehicle, the lidar sensors 120 are installed so that the azimuth angles of the lidar sensors overlap each other by the first azimuth angle α° at a position spaced αm (for example, about 1 m) from a front portion of the vehicle. Accordingly, an object positioned between the two lower lateral parts 152*b* may be overlappingly observed. As a result, a blind spot, which is not observed by the lidar sensors 120, may be prevented from occurring.

Here, the first azimuth angle α°, in which the azimuth angles of the two lower lateral parts 152*b* overlap each other, is set to an angle of about 5° to about 15°, preferably, about 10°. That is, when the first azimuth angle α° is about 5° or less, the azimuth angles of the two lower lateral parts 152*b* may be spaced apart from each other without overlapping each other due to vibration and impact occurring in the two lower lateral parts 152*b*, and thus, a blind spot, which is not observed by the lidar sensors 120, may occur. When the first azimuth angle α° is about 15° or more, disappearance of the first azimuth angle may be prevented, but more lidar sensors 120 have to be provided to cover an angle range of about 360° in the vehicle. Thus, the first azimuth angle α° is set to an angle of about 5° to about 15°, preferably, about 10°, and thus, the object may be stably observed through the lidar sensors 120.

Here, an installation surface 152*b*-1 of the lower lateral part 152*b*, on which the lidar sensor 120 is installed, is provided as an inclined surface, and thus, the two lidar sensors 120 may be spaced a predetermined angle from each other. As a result, the two lidar sensors 120 may be adjusted so that the azimuth angles of the lidar sensors overlap each other by the first azimuth angle α°. That is, the installation surfaces 152*b*-1 of the two lower lateral parts 152*b* are provided as surfaces inclined in a direction (left and right direction when viewed in FIG. 3) so as not to face each other. Accordingly, the two azimuth angles of the lidar sensors 120 may be adjusted to overlap each other by the first azimuth angle α°. For example, when the azimuth angle of the lidar sensor 120 is about 90°, the installation surface 152*b*-1 of the lower lateral part 152*b* is inclined at an angle of about 40° relative to the body block 151. Accordingly, the azimuth angles of the two lidar sensors 120 are adjusted to overlap each other by an angle of about 10°.

Here, an installation surface of the lower central part 152*a*, on which the radar sensor 110 is installed, protrudes further outward from the installation surface of the lower lateral part 152*b* on which the lidar sensor 120 is installed. Accordingly, the radar sensor 110 protrudes further outward than does the lidar sensor 120, and thus, the azimuth angle of the radar sensor 110 may be stably ensured.

In the lower block 152 having the above-described structure, the radar sensor 110 and the lidar sensor 120 may be stably installed, and particularly, the two lidar sensors 120 may be installed so that the azimuth angles of the lidar sensors overlap each other by the first azimuth angle α°.

The upper block 153 includes an upper central part 153*a* on which the camera sensor 130 is installed and two upper lateral parts 153*b* which are respectively provided on both sides of the upper central part 153*a*. The infrared sensor 140 is installed on each of the two upper lateral parts 153*b*. That is, since the camera sensor 130 has an azimuth angle greater than that of the infrared sensor 140 in the upper block 153, the camera sensor 130 is disposed on a central area, and the infrared sensors 140 are disposed on both sides of the camera sensor 130. For example, one camera sensor is installed on the upper central part 153*a* of the upper block 153 because the camera sensor 130 is capable of covering an angle range of about 110° or more when mounted on a vehicle, and two infrared sensors are installed on the upper lateral parts 153*b* of the upper block 153 to cover an angle range of about 110° or more because the infrared sensor 140 is capable of covering an angle range of about 90° when mounted on a vehicle.

Here, the two infrared sensors 140 are installed on the two upper lateral parts 153*b* so that the azimuth angles of the infrared sensors 140 overlap each other by a second azimuth angle β°. That is, the infrared sensors 140 have azimuth angles for observing the object, and the azimuth angles are allowed to partially overlap each other. More specifically, when the two infrared sensors 140 are mounted on the vehicle, the infrared sensors 140 are installed so that the azimuth angles of the infrared sensors 140 overlap each other by the second azimuth angle β° at a position spaced βm (for example, about 1 m) from a front portion of the vehicle. Accordingly, an object positioned between the two upper lateral parts 153*b* may be overlappingly observed. As a result, a blind spot, which is not observed by the infrared sensors 140, may be prevented from occurring.

Here, the second azimuth angle β°, in which the azimuth angles of the upper lateral parts 153*b* overlap each other, is set to an angle of about 5° to about 15°, preferably, about 10°. That is, when the second azimuth angle β° is about 5° or less, the azimuth angles of the two infrared sensors 140 may be spaced apart from each other without overlapping each other due to vibration and impact occurring in the two upper lateral parts 153*b*, and thus, the blind spot, which is not observed by the infrared sensors 140, may occur. When the second azimuth angle β° is about 15° or more, disappearance of the second azimuth angle β° may be prevented. However, more infrared sensors 140 have to be provided to cover an angle range of about 360° in the vehicle. Thus, the second azimuth angle β° is set to an angle of about 5° to about 15°, preferably, about 10°, and thus, the object may be stably observed through the infrared sensors 140.

Here, an installation surface 153*b*-1 of the upper lateral part 153*b*, on which the infrared sensor 140 is installed, is provided as an inclined surface, and thus, the two infrared sensors 140 may be spaced apart from each other so that the azimuth angles of the infrared sensors 140 overlap each other by the second azimuth angle β°. That is, the installation surfaces 153b-1 of the two upper lateral parts 153b are provided as surfaces inclined in directions so as not to face each other. Accordingly, the two azimuth angles of the infrared sensors 140 may be adjusted to overlap each other by the second azimuth angle β°. As an example, when the azimuth angle of the infrared sensor 140 is about 90°, the installation surface of the upper lateral part 153b is inclined at about 40° relative to the body block 151. Accordingly, the azimuth angles of the two infrared sensors 140 may be adjusted to overlap each other by about 10°.

Here, an installation surface of the upper central part 153a, on which the camera sensor 130 is installed, protrudes further outward from the installation surface of the upper lateral part 153b on which the infrared sensor 140 is installed. Accordingly, the camera sensor 130 protrudes further outward than does the infrared sensor 140, and thus, the azimuth angle of the camera sensor 130 may be stably ensured.

In the upper block 153 having the above-described structure, the camera sensor 130 and the infrared sensor 140 may be stably installed, and particularly, the two infrared sensors 140 may be installed so that the azimuth angles of the infrared sensors overlap each other by the second azimuth angle.

Therefore, the body member 150 includes the body block 151, the lower block 152, and the upper block 153, and thus, the radar sensor 110, the lidar sensor 120, the camera sensor 130, and the infrared 140 may be stably installed.

Here, the body member 150 is made of a heat dissipation material, such as aluminum, and thus, may stably absorb heat generated from the radar sensor 110, the lidar sensor 120, the camera sensor 130, and the infrared 140 and then discharge the heat to the outside. As a result, temperatures of the radar sensor 110, the lidar sensor 120, the camera sensor 130, and the infrared 140 may be reduced.

Here, the body block 151, the lower block 152, and the upper block 153 are integrated with each other, and thus, ease of manufacture may be improved.

Here, the sensor cluster device 100 in accordance with the first exemplary embodiment of the present invention further includes a heat dissipation member 200 that discharges heat, which is transferred from the radar sensor 110, the lidar sensor 120, the camera sensor 130, and the infrared sensor 140 to the body member 150, to the outside.

The heat dissipation member 200 is configured to reduce temperatures of the radar sensor, the lidar sensor, the camera sensor, and the infrared sensor. The heat dissipation member 200 includes a heat dissipation part 210 provided on a rear surface of the body member 150 and a heat dissipation fan 220 coupled to the heat dissipation part 210. That is, the heat dissipation part 210 absorbs heat transferred to the body member 150 and then discharges the heat to the outside, and the heat dissipation fan 220 cools the heat dissipation part 210 through air to improve heat dissipation performance.

The heat dissipation part 210 is configured to dissipate heat of the body member 150, and includes a plurality of main heat dissipation fins 211 that are provided on a central portion of a rear surface of the body block 151 included in the body member 150.

Each of the main heat dissipation fins 211 includes a body 211a having a horizontal plate shape and blades 211b extending diagonally from both sides of the body 211a. That is, the main heat dissipation fins 211 absorb heat of the body member 150 through the body 211a and the blades 211b, and then discharges the heat to the outside. Accordingly, the heat transferred to the body member 150 may be effectively dissipated.

Here, the plurality of main heat dissipation fins 211 are provided to overlap each other in a vertical direction of the body member, and supports that fix the main heat dissipation fins 211 are provided on upper and lower portions of the main heat dissipation fins 211 that overlap each other. Here, the supports are made of the same material as the main heat dissipation fins 211 and provided with heat dissipation blades on an outer portion thereof.

The heat dissipation part 210 also includes a plurality of auxiliary heat dissipation fins 212 provided on edge portions of the rear surface of the body member 150.

That is, the plurality of auxiliary heat dissipation fins 211 are provided at certain intervals along the edge portions of the rear surface of the body block 151. That is, the auxiliary heat dissipation fins 212 may effectively absorb the heat transferred to the edge portions of the body block 151, and then discharge the heat.

The heat dissipation part 210 having the above-described structure may absorb the heat, which is transferred from the radar sensor 110, the lidar sensor 120, the camera sensor 130, and the infrared sensor 140 to the body member 150, and then discharge the heat to the outside. As a result, temperatures of the radar sensor 110, the lidar sensor 120, the camera sensor 130, and the infrared sensor 140 may be significantly reduced.

Here, the main heat dissipation fin 211 and the auxiliary heat dissipation fins 212 are integrated with each other on the rear surface of the body block 151, and thus, may effectively absorb the heat transferred to the body block 151 and then discharge the heat to the outside.

Here, each of the main heat dissipation fin 211 and the auxiliary heat dissipation fins 212 is made of the same heat dissipation material, i.e., aluminum, as the body member 150 and thus, may effectively discharge the heat, which is transferred to the body member 150, to the outside.

The heat dissipation fan 220 is configured to improve the heat dissipation performance of the heat dissipation part, and is coupled over the body 211a and the blades 211b so as to blow air into a space between the body 211a and the blades 211b. Also, the heat dissipation fan 220 includes a fan case and a rotary blade that rotates when power is applied. Accordingly, the body 211a and the blades 211b are cooled by air that is generated from the rotary blade of the heat dissipation fan 220, and thus, the temperature of the body member 150 may be effectively reduced.

Here, a speed of the heat dissipation fan 220 is adjusted through weather measured by the camera sensor 130 and a temperature measured by the infrared sensor 140.

As a first example, when the weather measured by the camera sensor 130 is considered to be fine, and the temperature measured by the infrared sensor 140 is about 30° or more, the heat dissipation fan 220 is controlled to rotate at a high speed so as to increase cooling efficiency.

As a second example, when the weather measured by the camera sensor 130 is considered to be cloudy, and the temperature measured by the infrared sensor 140 ranges from about 5° to about 20°, the heat dissipation fan 220 is controlled to rotate at a low speed so as to maintain the current cooling performance.

As a third example, when the weather measured by the camera sensor 130 is considered to be weather with rain or snow, and the temperature measured by the infrared sensor 140 is about 5° or less, the heat dissipation fan 220 is controlled to stop because it is sufficient to use only the cooling performance of the heat dissipation part 210.

Thus, the heat dissipation member 200 may discharge the heat, which is transferred from the radar sensor 110, the lidar sensor 120, the camera sensor 130, and the infrared sensor 140 to the body member 150, to the outside. As a result, the radar sensor 110, the lidar sensor 120, the camera sensor 130, and the infrared sensor 140 may be effectively cooled.

Here, the heat dissipation member 200 includes a partition wall member 230 that isolates the radar sensor 110, the lidar sensor 120, the camera sensor 130, and the infrared sensor 140, which are provided on the body member 150, from each other.

Figure 3:
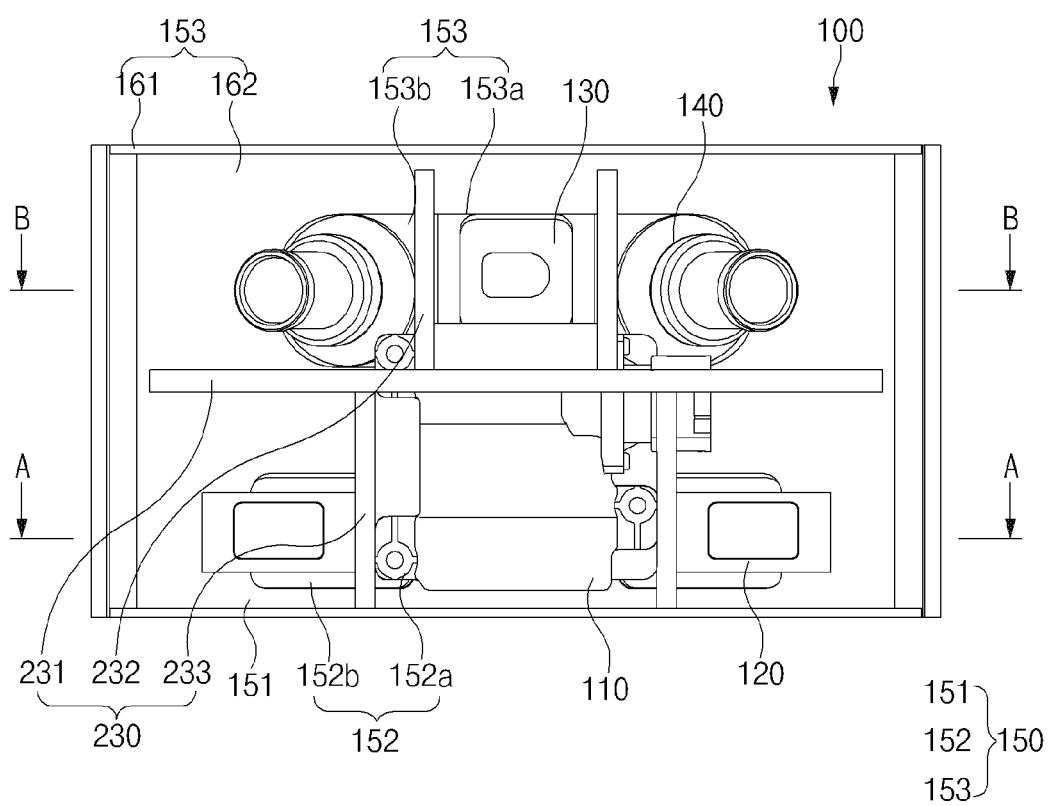
FIG. 3 is a front view of FIG. 1.
Figure 4:
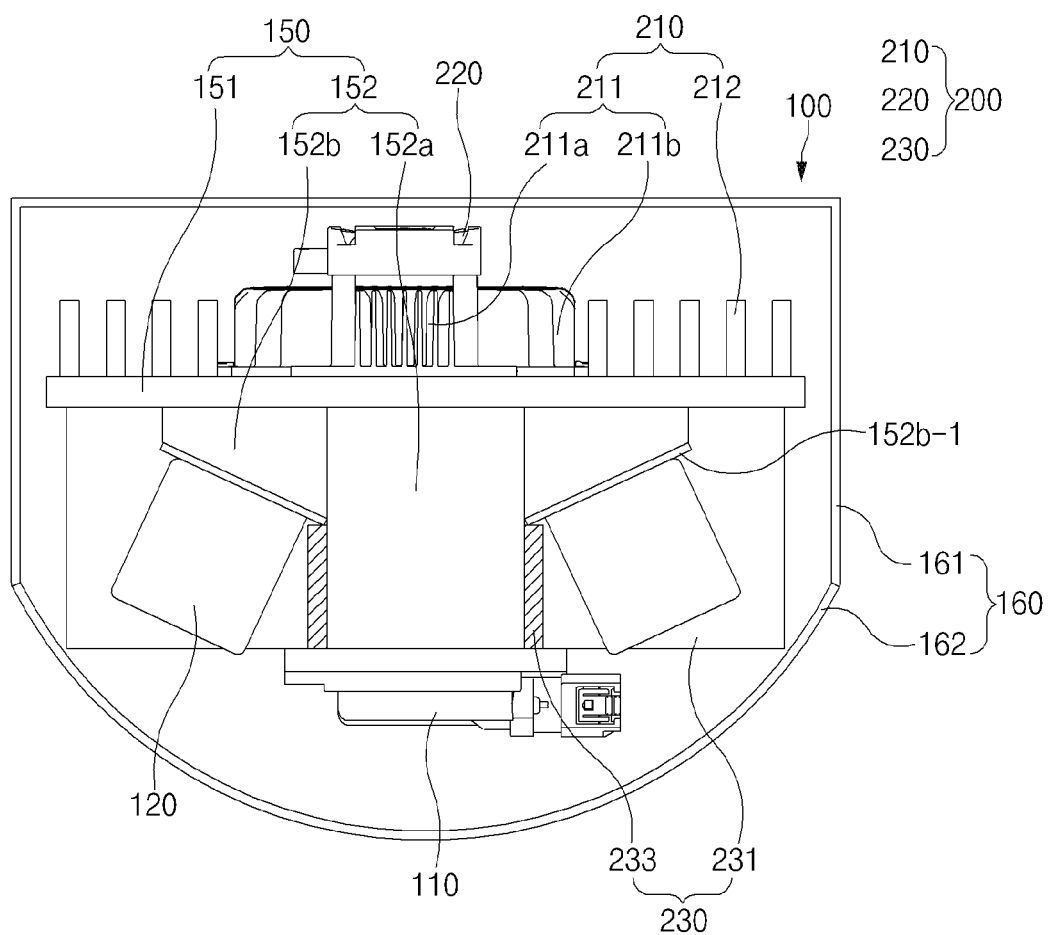
FIG. 4 is a cross-sectional view taken along line A-A' of FIG. 3.
Figure 5:
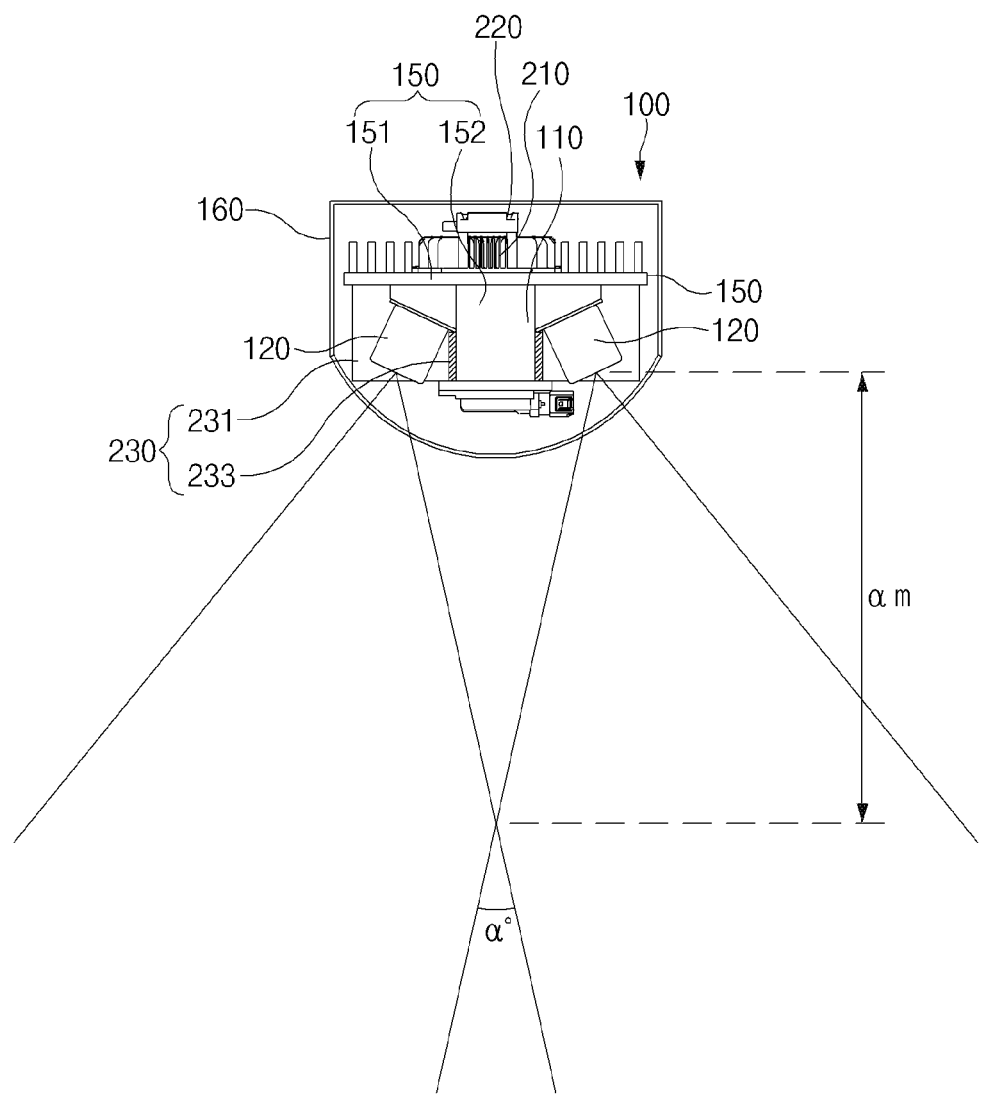
FIG. 5 is a view illustrating azimuth angles of lidar sensors in the sensor cluster device in accordance with the first exemplary embodiment of the present invention.
Figure 6:
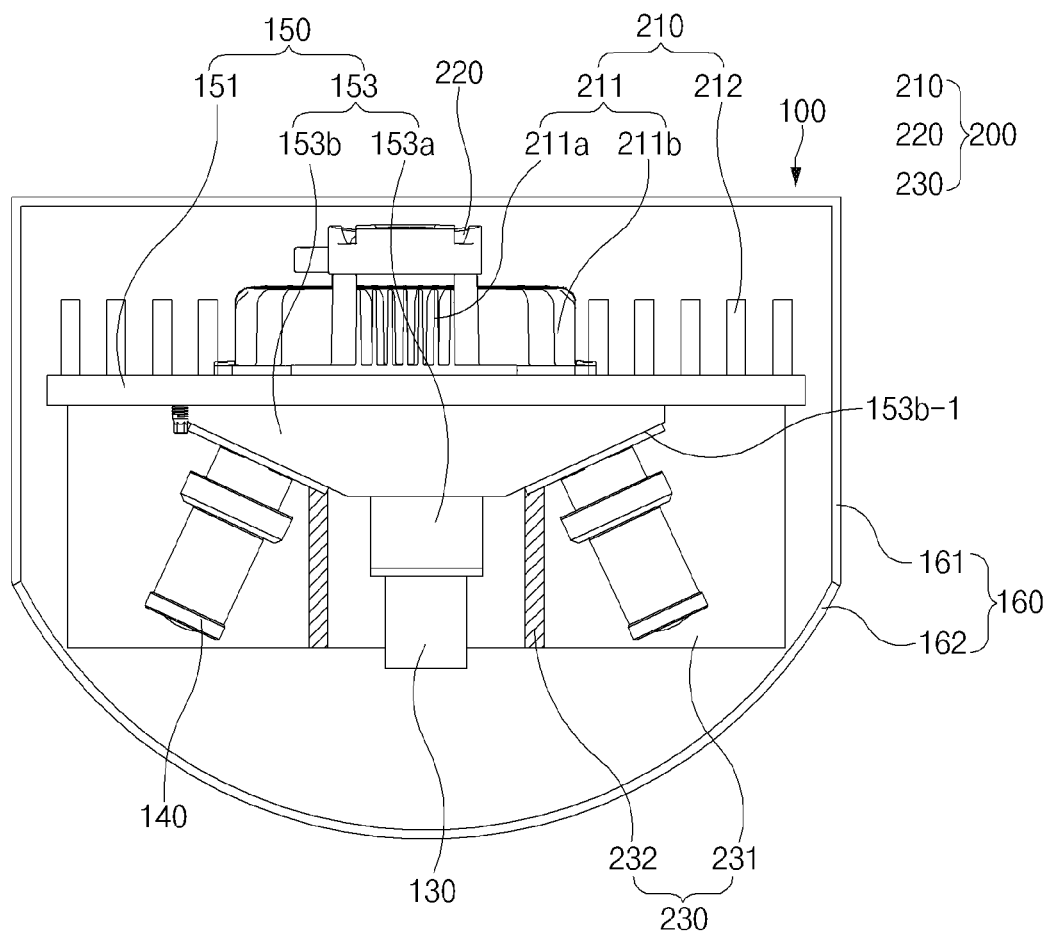
FIG. 6 is a cross-sectional view taken along line B-B' of FIG. 3.
Figure 7:
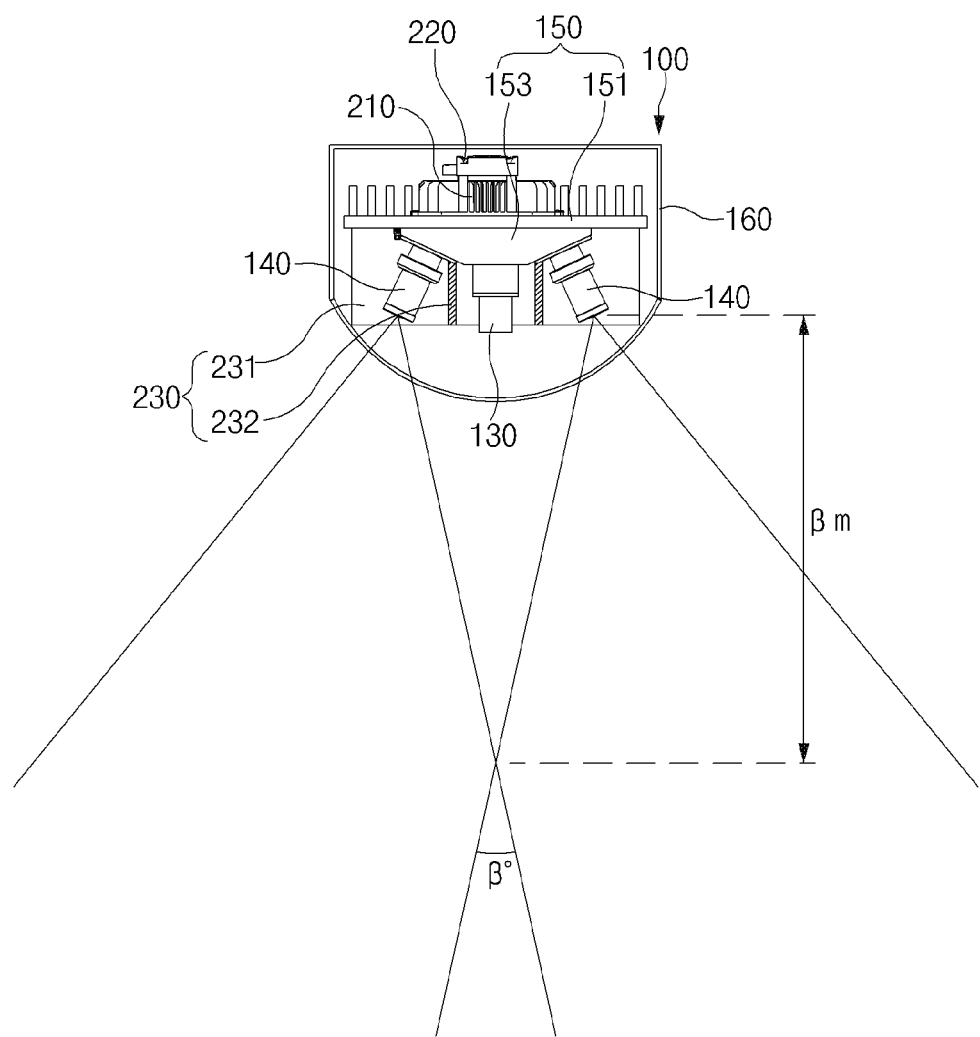
FIG. 7 is a view illustrating azimuth angles of infrared sensors in the sensor cluster device in accordance with the first exemplary embodiment of the present invention.

As shown in FIG. 3, the partition wall member 230 isolates the radar sensor 110, the lidar sensor 120, the camera sensor 130, and the infrared sensor 140 so that the heat generated from the sensors are prevented from being transferred to the corresponding sensors.

That is, the partition wall member 230 includes a single horizontal partition wall 231, which is provided in the body member 150 between both the radar sensor 110 and the lidar sensor 120 and both the camera sensor 130 and the infrared sensor 140 to isolate the radar sensor and the lidar sensor from the camera sensor and the infrared radar. The single horizontal partition wall 231 is provided as a flat horizontal plate.

Accordingly, the horizontal partition wall 231 may prevent the heat of the radar sensor 110 and the lidar sensor 120 from being transferred to the camera sensor 130 and the infrared sensor 140, and also prevent the heat of the camera sensor 130 and the infrared sensor 140 from being transferred to the radar sensor 110 and the lidar sensor 120.

Here, the partition wall member 230 is provided with two upper vertical walls 232 above the single horizontal partition wall 231. Accordingly, the camera sensor 130 is positioned between the two upper vertical partition walls 232, and the infrared sensor 140 is positioned on each of two areas outside the two upper vertical partition walls 232. That is, the two upper vertical walls 232 prevents the heat of the camera sensor 130 from being transferred to the infrared sensors 140, and also presents the heat of the infrared sensors 140 from being transferred to the camera sensor 130.

Here, the partition wall member 230 is provided with two lower vertical walls 233 below the single horizontal partition wall 231. Accordingly, the radar sensor 110 is positioned between the two lower vertical partition walls 233, and the lidar sensor 120 is positioned on each of two areas outside the two lower vertical partition walls 233. That is, the two lower vertical walls 233 prevent the heat of the radar sensor 110 from being transferred to the lidar sensors 120, and also presents the heat of the lidar sensors 120 from being transferred to the radar sensor 110.

Here, the horizontal partition wall 231, the upper vertical partition walls 232, and the lower vertical partition walls 233 are integrated with each other on the body member 150 and made of a heat dissipation material. Accordingly, the heat transferred to the body member 150 may be effectively dissipated.

Here, the sensor cluster device 100 in accordance with the first exemplary embodiment of the present invention further includes a cover member 160 that accommodates the radar sensor 110, the lidar sensor 120, the camera sensor 130, the infrared sensor 140, the body member 150, and the heat dissipation member 200.

The cover member 160 is configured to protect the body member 150 on which the radar sensor 110, the lidar sensor 120, the camera sensor 130, and the infrared sensor 140 are installed. As shown in FIG. 1, the cover member 160 includes a case 161 and a cover 162. In the case 161, an accommodation space with one surface opened is provided to accommodate the body member 150 on which the radar sensor 110, the lidar sensor 120, the camera sensor 130, and the infrared sensor 140 are installed. The cover 162 is coupled to the opening of the case 161.

Here, the cover 162 is slidably coupled to the case 161 and made of a transparent or translucent material.

Thus, the cover member 160 may stably protect the body member 150 on which the radar sensor 110, the lidar sensor 120, the camera sensor 130, and the infrared sensor 140 are installed.

Figure 2:
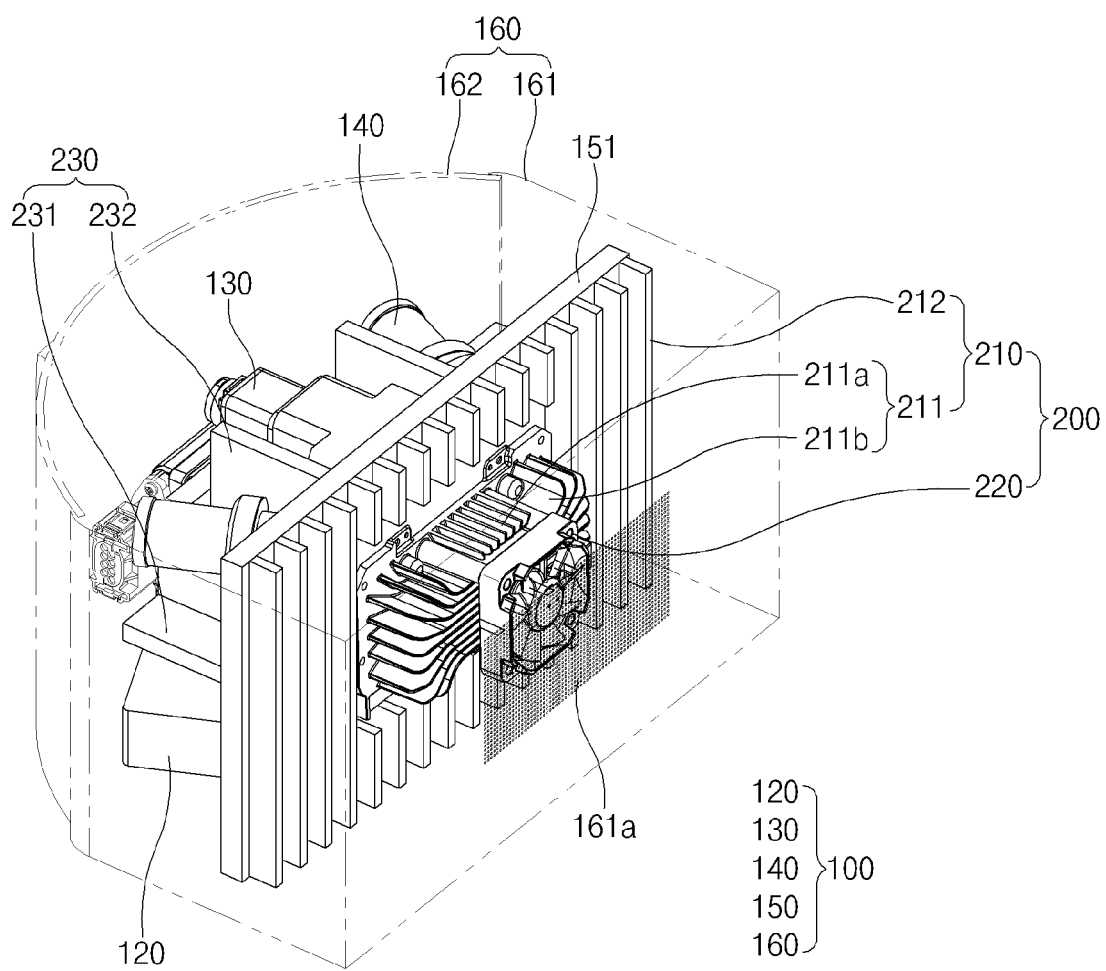
FIG. 2 is a rear perspective view illustrating the sensor cluster device in accordance with the first exemplary embodiment of the present invention.

As shown in FIG. 2, the cover member 160 has a plurality of punched holes 161a that are defined on a surface of the case 161 corresponding to the heat dissipation fan 220. Air may be easily suctioned into the cover member 160 through the plurality of punched holes 161a by the heat dissipation fan 220, and thus heat of the heat dissipation part coupled to the body member may be effectively dissipated.

Here, the sensor cluster device 100 in accordance with the first exemplary embodiment of the present invention includes a lower angle-adjusting member 170 that adjusts an angle of the lidar sensor 120.

Figure 8:
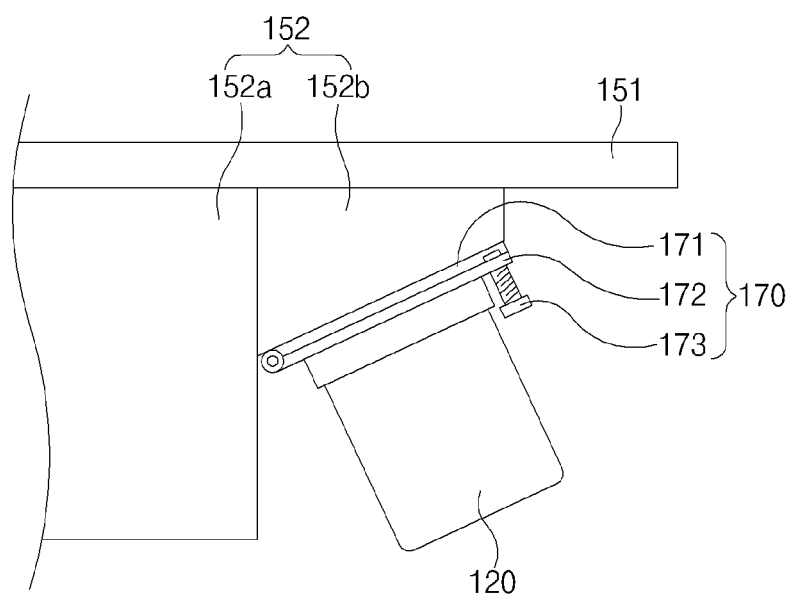
FIG. 8 is a plan view illustrating a lower angle-adjusting member provided in the sensor cluster device in accordance with the first exemplary embodiment of the present invention.
Figure 9:
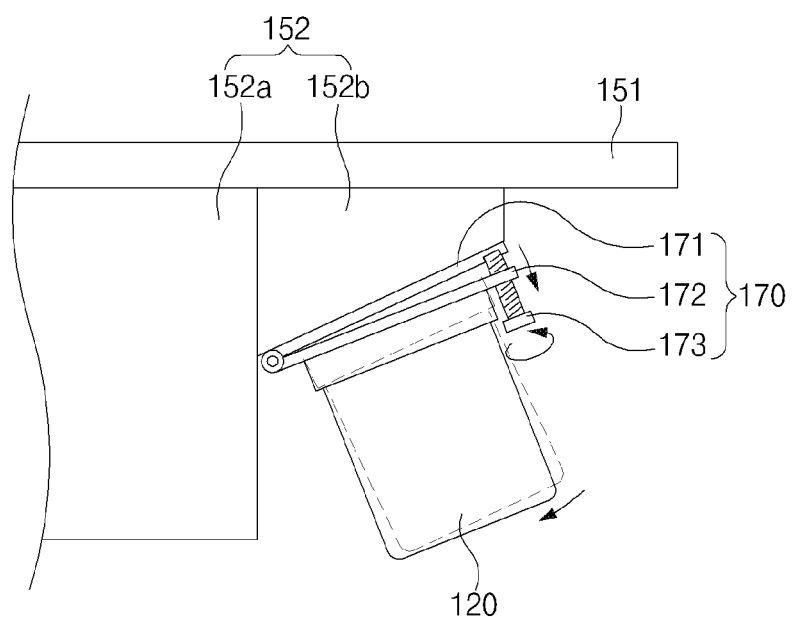
FIG. 9 is a plan view illustrating an operation state of the lower angle-adjusting member.

As shown in FIGS. 8 and 9, the lower angle-adjusting member 170 allows the lidar sensor 120 to rotate, relative to the lower lateral part 152b, in a direction of the lower central part 152a or in a direction opposite to the lower central part 152a to increase or decrease in the first azimuth angle $\alpha°$. Accordingly, the first azimuth angle $\alpha°$ defined by the two lidar sensors 120 may be adjusted.

For example, the lower angle-adjusting member 170 is provided between the lidar sensor 120 and the lower lateral part 152b. The lower angle-adjusting member 170 includes a lower fixed plate 171 and a lower movable plate 172, which have ends (ends of a side adjacent to the lower central part) rotatably hinge-coupled to each other, and a lower adjusting bolt 173 that passes through the other end of the lower movable plate 172 and is supported by the other end of the lower fixed plate 171. That is, in the lower angle-adjusting member 170, the lower movable plate 172 moves along threads of the lower adjusting bolt 173 when the lower adjusting bolt 173 rotates. Here, the lower movable plate 172 rotates relative to the one end of the lower fixed plate 171 toward the lower central part 152a, and the lidar sensor 120 rotates toward the lower central part 152a in conjunction with the lower movable plate 172. Accordingly, the first azimuth angle $\alpha°$ overlapping between the two lidar sensors 120 may increase.

Here, the sensor cluster device 100 in accordance with the first exemplary embodiment of the present invention includes an upper angle-adjusting member 180 that adjusts an angle of the infrared sensor 140.

The upper angle-adjusting member 180 allows the infrared sensor 140 to rotate, relative to the upper lateral part 153b, in a direction of the upper central part 153a or in a direction opposite to the upper central part 153a, and thus, the second azimuth angle $\beta°$ between the two infrared sensors 140 may increase or decrease.

Figure 10:
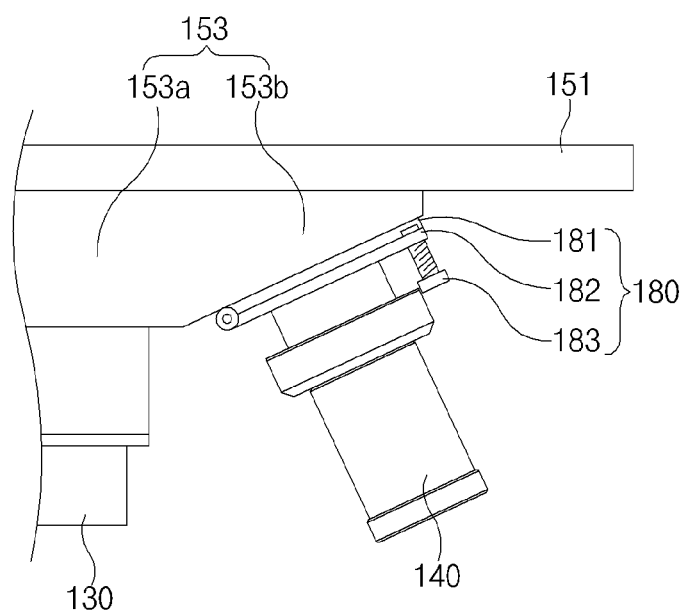
FIG. 10 is a plan view illustrating an upper angle-adjusting member provided in the sensor cluster device in accordance with the first exemplary embodiment of the present invention.
Figure 11:
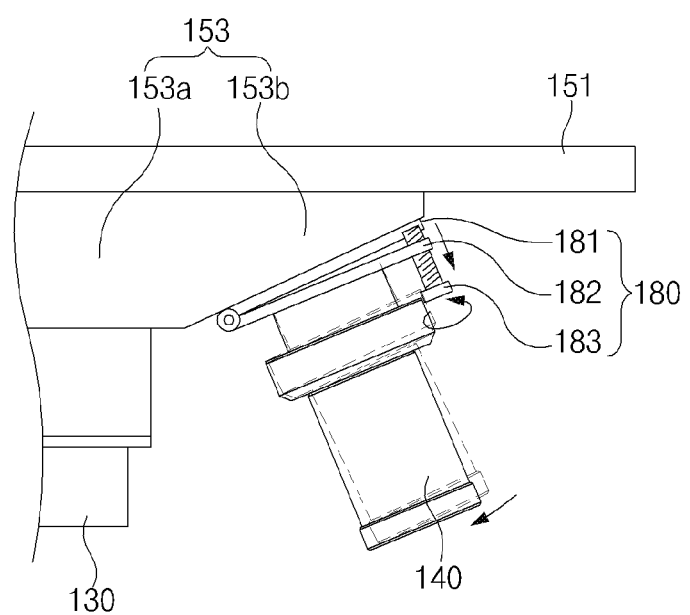
FIG. 11 is a plan view illustrating an operation state of the upper angle-adjusting member.

As shown in FIGS. 10 and 11, the upper angle-adjusting member 180 is provided between the infrared sensor 140 and the upper lateral part 153b. The upper angle-adjusting member 180 includes an upper fixed plate 181 and an upper movable plate 182, which have ends (ends of a side adjacent to the upper central part) rotatably hinge-coupled to each other, and an upper adjusting bolt 183 that passes through the other end of the upper movable plate 182 and is supported by the other end of the upper fixed plate 181. That is, in the upper angle-adjusting member 180, the upper movable plate 182 moves along threads of the upper adjusting bolt 183 when the upper adjusting bolt 183 rotates. Here, the upper movable plate 182 rotates relative to the one end of the upper fixed plate 181 toward the upper central part 153a, and the infrared sensor 140 rotates toward the upper central part 153a by being interlocked with the upper movable plate 182. Accordingly, the second azimuth angle β° between the two infrared sensors 140 may increase.

The sensor cluster device 100 having the above-described structure in accordance with the first exemplary embodiment of the present invention may effectively reduce the temperatures of the radar sensor 110, the lidar sensor 120, the camera sensor 130, and the infrared sensor 140.

Hereinafter, in describing another exemplary embodiment in accordance with the present invention, components having the same function as in the foregoing exemplary embodiment are given with the same reference numerals, and duplicate descriptions will be omitted.

Figure 12:
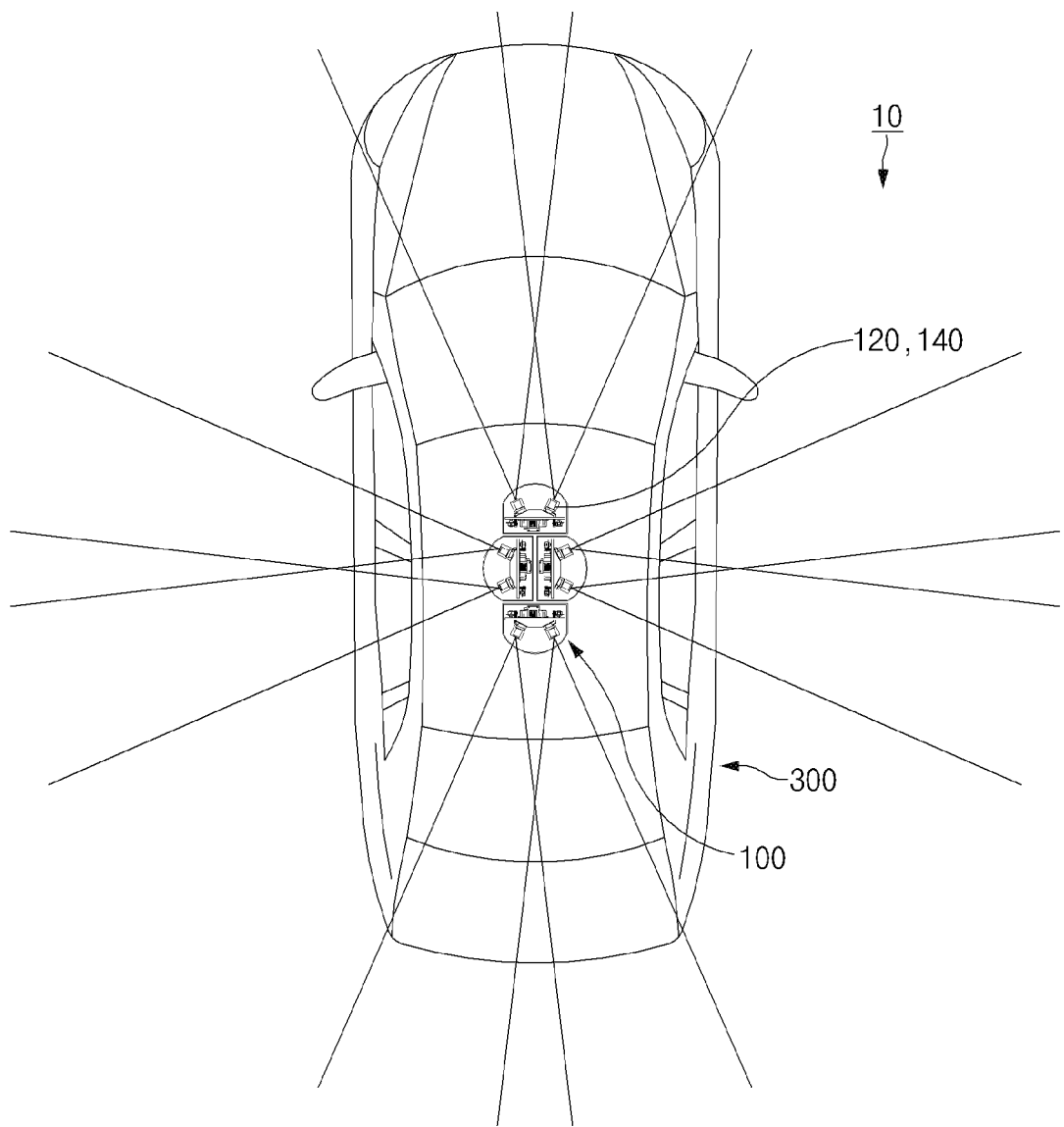
FIG. 12 is a plan view illustrating a first example of a vehicle in accordance with a second exemplary embodiment of the present invention.
Figure 13:
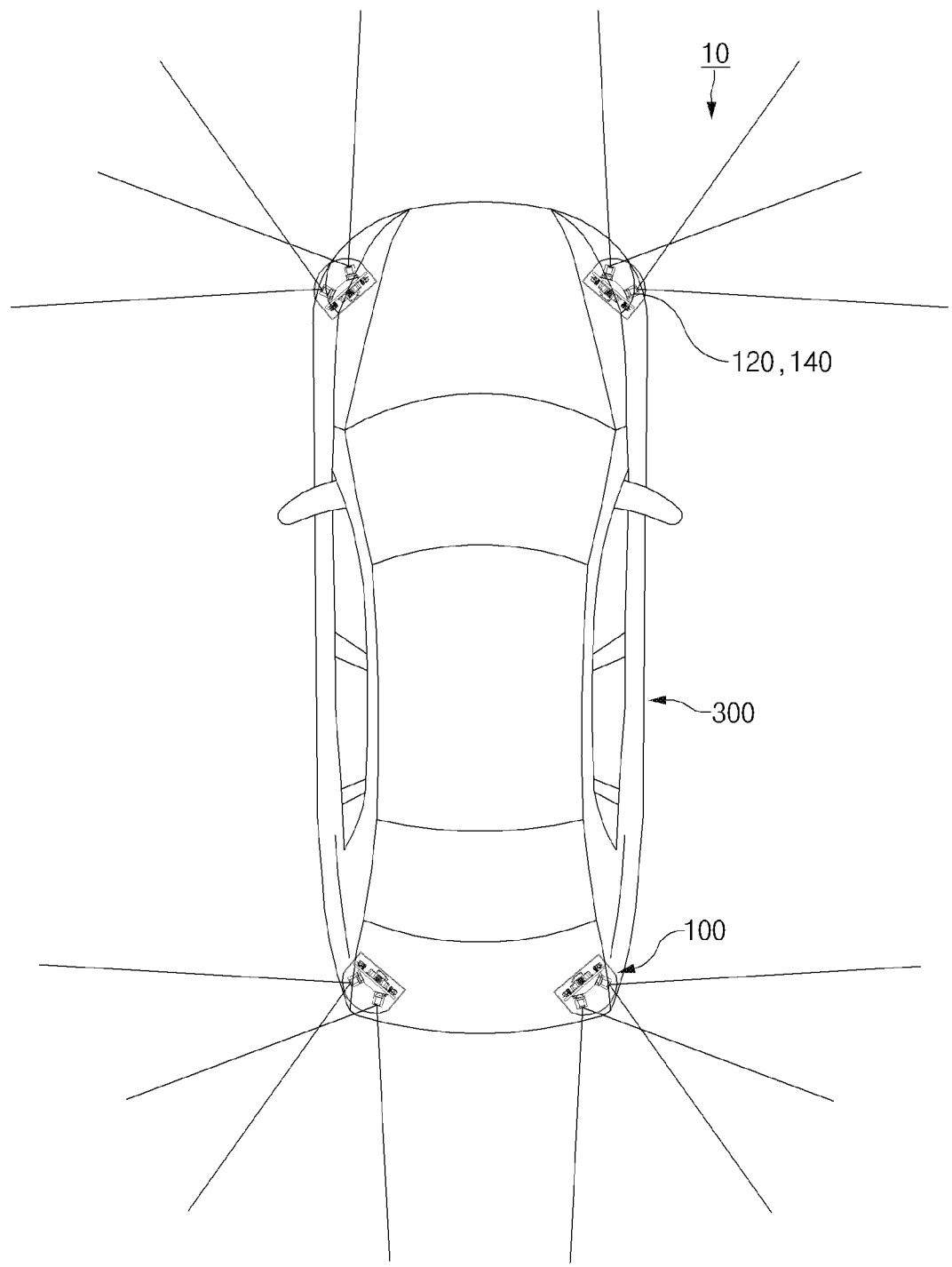
FIG. 13 is a plan view illustrating a second example of a vehicle in accordance with the second exemplary embodiment of the present invention.

A vehicle 10 in accordance with a second exemplary embodiment of the present invention includes a sensor cluster device 100 and a vehicle body 300 on which the at least one sensor cluster device 100 is installed, as illustrated in FIGS. 12 and 13.

Here, the sensor cluster device 100 has the same components and functions as the sensor cluster device in accordance with the first embodiment described above, and thus, duplicate descriptions will be omitted.

That is, in the vehicle 10 in accordance with the second embodiment, the sensor cluster device 100, which includes a radar sensor 110, a lidar sensor 120, a camera sensor 130, an infrared sensor 140, a cover member 160, and a heat dissipation member 200, may be mounted on a vehicle body 300 to enhance efficiency of installation and acquire accurate information.

As a first example, when referring to FIG. 12, the vehicle 10 in accordance with the second exemplary embodiment of the present invention includes four sensor cluster devices 100 and a vehicle body 300. The four sensor cluster devices 100 are installed, on a top surface of the vehicle body 300, so as to be directed toward front, rear, left, and right sides, respectively. Accordingly, the vehicle 10 may be stably observed in an angle range of about 360°.

As a second example, when referring to FIG. 13, the vehicle 10 in accordance with the second exemplary embodiment of the present invention includes four sensor cluster devices 100 and a frame body 300. The four sensor cluster devices 100 are installed in upper portions, that is, in both front lateral portions and both rear lateral portions of the vehicle body 300. Accordingly, the vehicle 10 may be stably observed in an angle range of about 360°.

In particular, the vehicle 10 in accordance with the second exemplary embodiment of the present invention may significantly reduce temperature rise of the sensor cluster device 100 through the heat dissipation member 200, and thus, the sensor cluster device 100 may be prevented from exploding or igniting even when driven for a long period of time.

The sensor cluster device in accordance with the present invention may include the radar sensor 110, the lidar sensor 120, the camera sensor 130, the body member 150, and the heat dissipation member 200. Accordingly, the efficiency of installation may be enhanced, and the heat of the radar sensor 110, the lidar sensor 120, the camera sensor 130, and the infrared sensor 140 may be effectively dissipated to suppress the temperature rise.

Also, in the sensor cluster device in accordance with the present invention, the heat dissipation member 200 may include the heat dissipation part 210 and the heat dissipation fan 220. Accordingly, excessively high operating temperatures of the radar sensor 110, the lidar sensor 120, the camera sensor 130, and the infrared sensor 140 may be prevented.

Also, in the sensor cluster device 100 in accordance with the present invention, the heat dissipation part 210 may include the main heat dissipation fins 211 and auxiliary heat dissipation fins 212. Accordingly, the heat, which is transferred from the radar sensor 110, the lidar sensor 120, the camera sensor 130, and the infrared sensor 140 to the entire body member 150, may be effectively absorbed and then discharged to the outside.

Also, in the sensor cluster device 100 in accordance with the present invention, the speed of the heat dissipation fan 220 may be adjusted through the weather measured by the camera sensor 130 and the temperature measured by the infrared sensor 140. That is, when the weather measured by the camera sensor 130 is considered to be fine, and the temperature measured by the infrared sensor is about 30° or more, the heat dissipation fan 220 may be allowed to rotate at the high speed. When the weather measured by the camera sensor 130 is considered to include rain or snow, and the temperature measured by the infrared sensor is about 10° or less, the heat dissipation fan 220 may be allowed to stop or rotate at the low speed. Accordingly, the temperatures of the radar sensor 110, the lidar sensor 120, the camera sensor 130, and the infrared sensor 140 may be effectively reduced.

Also, in the sensor cluster device 100 in accordance with the present invention, the body member 150 may be made of the heat dissipation material. Accordingly, the heat, which is generated from the radar sensor 110, the lidar sensor 120, the camera sensor 130, and the infrared sensor 140, may be absorbed into the entire body member 150, and thus, the temperatures of the radar sensor 110, the lidar sensor 120, the camera sensor 130, and the infrared sensor 140 may be effectively reduced.

Also, the sensor cluster device 100 in accordance with the present invention may include the partition wall member 230 that isolates the radar sensor 110, the lidar sensor 120, the camera sensor 130, and the infrared sensor 140 from each other. Accordingly, the heat generated in the radar sensor 110, the lidar sensor 120, the camera sensor 130, and the infrared sensor 140 may be prevented from being transferred to the corresponding sensors.

Also, in the sensor cluster device 110 in accordance with the present invention, the partition wall member 230 may be made of the heat dissipation material. Accordingly, the heat, which is generated in the radar sensor 110, the lidar sensor 120, the camera sensor 130, and the infrared sensor 140, may be effectively absorbed into the partition wall member 230 and then discharged to the outside.

Also, the sensor cluster device 100 in accordance with the present invention may further include the cover member 160 that accommodates the body member 150 on which the radar sensor 110, the lidar sensor 120, the camera sensor 130, and the infrared sensor 140 are installed. The cover member 160 may have the plurality of punched holes 161a that are defined in the surface corresponding to the heat dissipation fan 220. Accordingly, the heat, which is generated in the body member 150, on which the radar sensor 110, the lidar sensor 120, the camera sensor 130, and the infrared sensor 140 are installed, may be discharged to the outside of the cover member 160.

Also, the vehicle in accordance with the present invention may include the sensor cluster device 100. Accordingly, the temperature of the sensor cluster device 100 may be effectively reduced, and thus, the use for a long period of time may be possible.

The scope of the present invention is defined by the appended claims rather than the detailed descriptions, and it is possible to make various embodiments derived from the meaning and scope of the claims and their equivalents concept.

What is claimed is:

1. A sensor cluster device comprising:
a radar sensor configured to emit electromagnetic waves onto an object and receive the electromagnetic waves reflected from the object so as to acquire information on the object;
a lidar sensor configured to emit laser beams onto the object and receive the laser beams reflected from the object so as to acquire information on the object;
a camera sensor configured to capture an image of surroundings of the object and acquire information from the captured image;
an infrared sensor configured to detect heat radiated from peripheral objects in the surroundings of the object to observe the object and the peripheral objects;
a body member having a front surface on which the radar sensor, the lidar sensor, the camera sensor, and the infrared sensor are installed;
a heat dissipation member configured to discharge heat, which is transferred from the radar sensor, the lidar sensor, the camera sensor, and the infrared sensor to the body member, to the outside; and
a partition wall member configured to thermally isolate the radar sensor, the lidar sensor, the camera sensor, and the infrared sensor, which are provided on the body member, from each other,
wherein the partition wall member is made of a heat dissipation material.

2. The sensor cluster device of claim 1, wherein the heat dissipation member comprises a heat dissipation part provided on a rear surface of the body member and a heat dissipation fan coupled to the heat dissipation part.

3. The sensor cluster device of claim 2, wherein the heat dissipation part comprises a plurality of main heat dissipation fins provided on a central portion of the rear surface of the body member.

4. The sensor cluster device of claim 3, wherein the heat dissipation part further comprises a plurality of auxiliary heat dissipation fins provided on an edge of the rear surface of the body member.

5. The sensor cluster device of claim 4, wherein the main heat dissipation fin and the auxiliary heat dissipation fins are integrated with each other on the rear surface of the body member.

6. The sensor cluster device of claim 3, wherein:
each of the main heat dissipation fins comprises a body having a horizontal plate shape and a blade extending diagonally from both sides of the body; and
the heat dissipation fan is coupled over the body and the blades so as to blow air into a space between the body and the blades.

7. The sensor cluster device of claim 1, wherein the body member is made of a heat dissipation material.

8. The sensor cluster device of claim 1, wherein the partition wall member comprises a single horizontal partition wall configured to isolate the radar sensor and the lidar sensor from the camera sensor and the infrared radar.

9. The sensor cluster device of claim 8, wherein:
two upper vertical partition walls are provided over the single horizontal partition wall; and
the camera sensor is positioned between the two upper vertical partition walls, and the infrared sensor is positioned on each of two areas outside the two upper vertical partition walls.

10. The sensor cluster device of claim 8, wherein:
two lower vertical partition walls are provided below the single horizontal partition wall; and
the radar sensor is positioned between the two lower vertical partition walls, and the lidar sensor is positioned on each of two areas outside the two lower vertical partition walls.

11. The sensor cluster device of claim 10, wherein the horizontal partition wall, the upper vertical partition walls, and the lower vertical partition walls are integrated with each other on the body member.

12. The sensor cluster device of claim 2, further comprising a cover member that accommodates the body member on which the radar sensor, the lidar sensor, the camera sensor, and the infrared sensor are installed,
wherein the cover member comprises:
a case in which an accommodation space with one opened surface is provided to accommodate the body member on which the radar sensor, the lidar sensor, the camera sensor, and the infrared sensor are installed; and
a cover which is coupled to the one opened surface of the case.

13. The sensor cluster device of claim 12, wherein a plurality of punched holes are defined in a surface of the case that corresponds to the heat dissipation fan.

14. A vehicle comprising:
the sensor cluster device of claim 1; and
a vehicle body on which the at least one sensor cluster device is installed.

15. A sensor cluster device comprising:
a radar sensor configured to emit electromagnetic waves onto an object and receive the electromagnetic waves reflected from the object so as to acquire information on the object;
a lidar sensor configured to emit laser beams onto the object and receive the laser beams reflected from the object so as to acquire information on the object;
a camera sensor configured to capture an image of surroundings of the object and acquire information from the captured image;
an infrared sensor configured to detect heat radiated from peripheral objects in the surroundings of the object to observe the object and the peripheral objects;
a body member having a front surface on which the radar sensor, the lidar sensor, the camera sensor, and the infrared sensor are installed; and
a heat dissipation member configured to discharge heat, which is transferred from the radar sensor, the lidar sensor, the camera sensor, and the infrared sensor to the body member, to the outside,
wherein:
the heat dissipation part comprises a plurality of main heat dissipation fins provided on a central portion of the rear surface of the body member; and
a speed of the heat dissipation fan is adjusted through weather measured by the camera sensor and a temperature measured by the infrared sensor.

* * * * *